United States Patent [19]

Kissinger

[11] Patent Number: 4,701,611
[45] Date of Patent: Oct. 20, 1987

[54] REFLECTIVITY COMPENSATED FIBER OPTIC SENSOR

[75] Inventor: Curtis D. Kissinger, Gloversville, N.Y.

[73] Assignee: Mechanical Technology Incorporated, Latham, N.Y.

[21] Appl. No.: 781,528

[22] Filed: Sep. 30, 1985

[51] Int. Cl.$^4$ ............................................. H01J 5/00
[52] U.S. Cl. ................................. 250/227; 250/231 R
[58] Field of Search .......................... 250/227, 231 R; 350/96.15, 96.29

[56] References Cited

U.S. PATENT DOCUMENTS 4,492,860 1/1985 Brogardh et al. .................. 250/227

Primary Examiner—Eugene R. LaRoche
Assistant Examiner—James C. Lee
Attorney, Agent, or Firm—Joseph V. Claeys; Joseph C. Sullivan

[57] ABSTRACT

A fiber optic proximity detector for use in sensing the relative position of an object or change thereof wherein the light is reflected by the target surface and returned along the transmitting fibers and utilized along with the reflected light returned along the receiving fibers so as to effect automatic surface reflectivity compensation with the detector being coupled to an optical extender to increase the working distance of the probe from the target.

4 Claims, 5 Drawing Figures

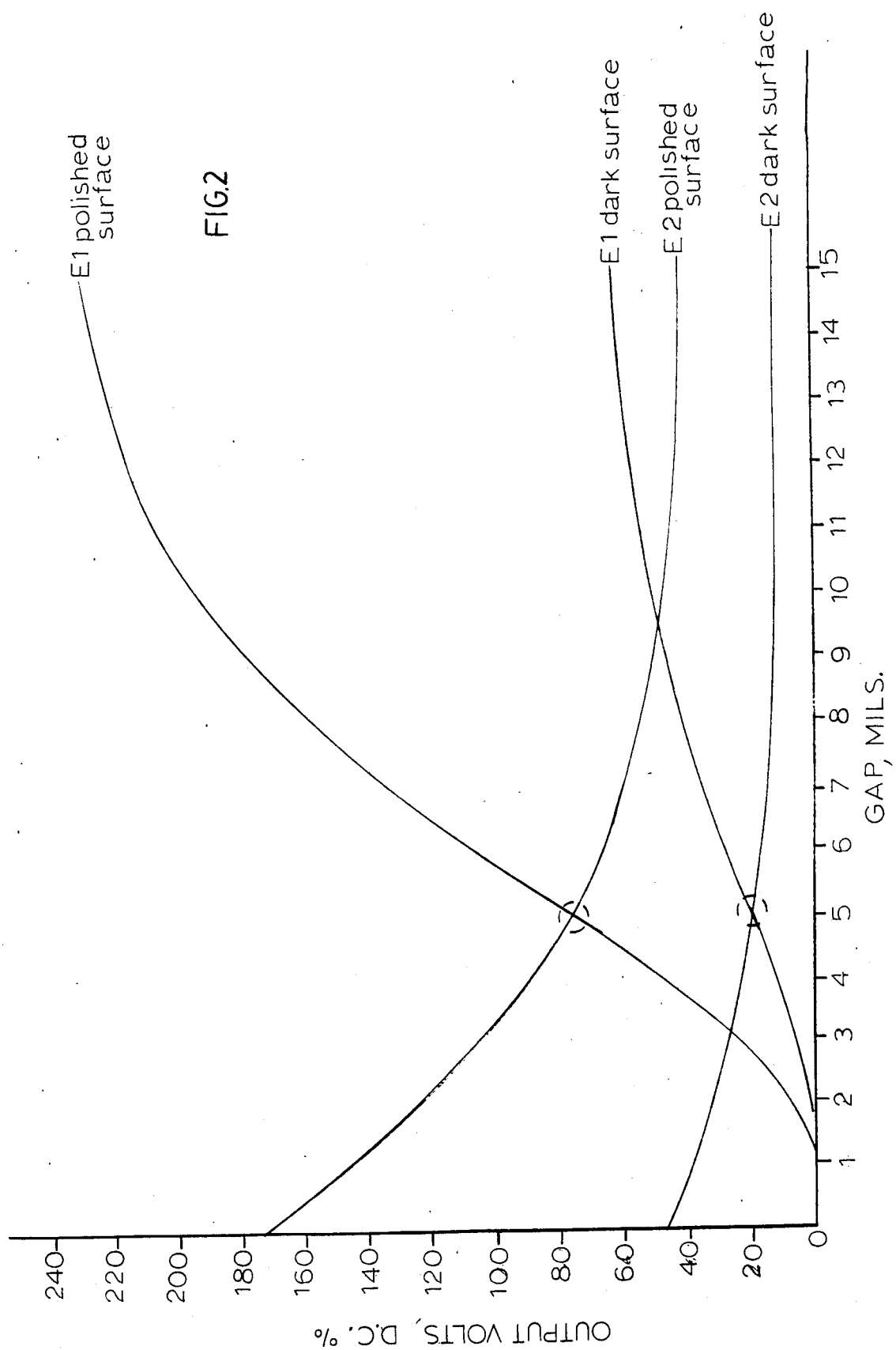

REFLECTIVITY COMPENSATED FIBER OPTIC SENSOR

FIELD OF THE INVENTION

The present invention relates to a proximity instrument and, more particularly, to a fiber optic proximity instrument or sensor having reflectivity compensation.

BACKGROUND OF THE INVENTION

The use of fiber optic proximity probes or sensors utilizing bifurcated fiber optic bundles and sensors and detectors to determine the distance to a target is well known. Such devices utilize a light beam transmitted from a light source by way of a bundle of light conducting optical fibers (transmit fibers) from a light source to a target. The light is reflected off the target and returned along other optical fibers (receive fibers) in the bundle back to a light intensity sensor. The intensity of the returned light is a function of the distance between the proximity probe tip and the target, so the output of the light sensor can be a very precise measure of that distance, or more importantly changes in that distance. Examples of such systems can be found in U.S. Pat. Nos. 3,327,584 issued June 27, 1976; 3,940,608 issued Feb. 24, 1976; and 4,247,764 issued Jan. 27, 1981.

However, it has been found that due to variations in the operating parameters, particularly the reflectivity of the target, a manual adjustment was necessary i.e., increasing or decreasing the source intensity in order to maintain the accuracy of the distance reading once reflectivity had changed. While in certain applications, such manual readjustment was acceptable, in other situations where perhaps the probe is inaccessible or required to be fixedly mounted, such manual adjustment becomes impossible.

Accordingly, there arose a need to provide for automatically compensating for a change in reflectivity. While there have been many attempts to provide for such a feature, some of which have been found very satisfactory, such as that recited in U.S. Pat. No. 4,247,764, there still remains a need for a simple yet effective means of compensating for reflectivity changes having wide applications.

Since typical fiber optic sensors are operative only within a defined working distance to the target, to produce the maximum sensitivity and linearity possible, the working distance of the probe from the target is often 1–5 mils. Typical of the prior art is its inability to provide a measurement of gap size with high signal sensitivity down to the point of contact, independent of surface gap scale and input light intensity. In many applications such a limited distance may restrict the application of the device. This is true also in the opposite direction, typical prior art probes lose their accuracy if the distance becomes too great. While U.S. Pat. No. 3,940,608 provides for an optical extender to increase this working space, it does not provide for automatic compensation for a change in reflectivity. Accordingly, there exists a need for such a device which can simply, yet effectively provide these features in a single device.

SUMMARY OF THE INVENTION

Accordingly, it is an object of the present invention to provide for a fiber optic sensor which is simple yet effective in providing for automatic compensation for the change in the reflectivity of the target so as to allow for an accurate reading and which has increased range while maintaining its accuracy.

These and other objects and advantages will be realized by the present invention which provides for a fiber optic proximity sensor which utilizes a probe which has the ability when connected to a light source and placed in front of a reflecting surface of obtaining two different reflectivity light signals from the same surface area and transmitting them to two separate light intensity detectors. These separate light signals are two characteristically different functions of gap size and accordingly may be used to provide reflectivity compensation.

While as aforenoted, fiber optic sensors exist that utilized the transmitting and receiving bifurcated optical lines to provide respective functions, the present device utilizes not only the reflected light signal to the receiver fiber but also that reflected back to the transmission line to provide the second signal. In the latter situation, a signal splitter is utilized to convey the signal received on the transmission lines to a second receiver line which in turn is coupled to a second detector. By the use of the transmission line as a receiver also, via the signal splitter, the optical signal reflected back into the line is detected which allows controlling of the two signals to compensate for changes in reflectivity, but also allows for a monitoring of the gap closer to contact of the probe with the target, providing an increased working distance in this direction. The present invention can implement such a sensor with an optical extender which increases the effective distance away from the target that the sensor can operate, so that in various applications, the working distance is less limited, thereby increasing the sensors' applicability to a multitude of situations.

BRIEF DESCRIPTION OF THE DRAWINGS

These and other objects and advantages will be realized by the present invention, the disclosure of which should be taken in conjunction with the drawings, wherein:

FIG. 2 is a graphical representation of the output of the separate detectors for varying reflectivity of the target, with respect to gap size;

DETAILED DESCRIPTION OF THE PREFERRED EMBODIMENT

Figure 1:
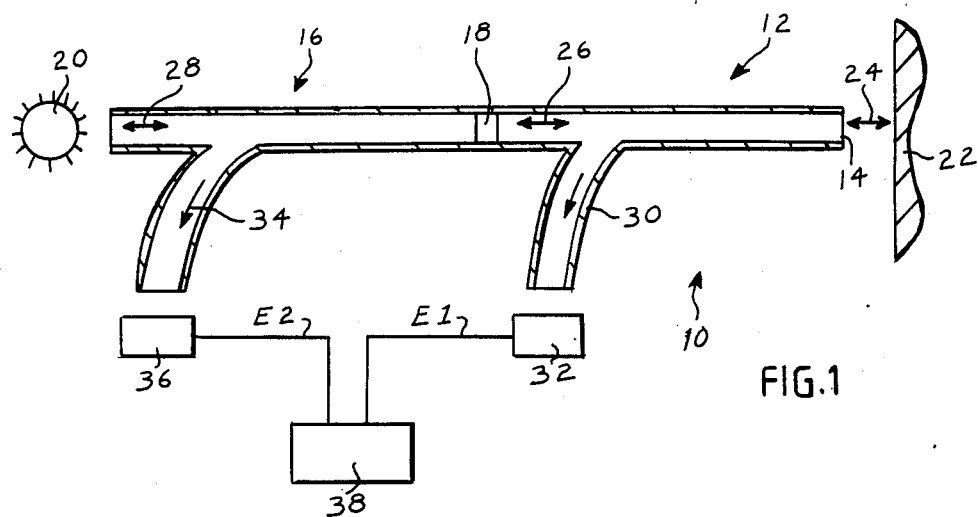
FIG. 1 is a schematic partially block diagram representation of the fiber optic sensor.

With reference now to the figures, FIG. 1 depicts a fiber optic sensor 10. As previously noted, typical fiber optic sensors work on the principle that light is transmitted to a target by way of transmit-fibers (T-fibers) of a bifurcated fiber optic probe and is reflected back and collected by receive-fibers (R-fibers) which in turn are coupled to a detector which detect the amount of reflected light. The amount of light reflected is a function of the distance between the tip of the probe and the target and the reflectance of the target, so as to enable the determination of this distance or the change in it.

A modification of this can be seen in FIG. 1 wherein the sensor 10 is provided with a first fiber optic assembly 12 terminating in a probe end 14 at one end, and coupled to a second fiber optic assembly 16 at the other end via an optically coupled separator, as will be later discussed.

The opposite end of assembly 16 is coupled to a light source 20 to effect transmission of light towards an object or target surface 22 which may have a variable grey or reflective scale over the span viewed by the probe end 14, with the purpose of the sensor 10 to determine the gap 24 therebetween.

The fiber assemblies 12 and 16 in this regard are composed of fiber bundles 26 and 28 respectively which include individual T and R fibers which may be organized in some fashion, but preferably have a random distribution particularly at the probe end 14, to reduce the effect of variations in spatial reflectivity of the target surface 22. Branching off of bundle 26 are R-fibers 30 which are optically coupled to a light detector 32. Similarly, branching off of bundle 28 are R-fibers 34 which are optically coupled to a second light detector 36. One of these light detectors, i.e., 32 is intended to receive the light reflected back from the target to the R-fibers in the fiber bundle 26 whereas the other detector, i.e., 36 is intended to receive the light reflected back from the target to the T-fibers in bundle 26 optically coupled to the R-fibers 34, in fiber optic assembly 16, by way of the separator gap 18.

The detectors 32 and 36 provide output signals $E_1$ and $E_2$ respectively, corresponding to the amount of light received by the respective detectors. The signals $E_1$ and $E_2$ are in turn fed into a ratioing or compensating means 38, which provides a ratioing of the signals $E_1$ and $E_2$ to provide compensation for variation in target reflectivity.

More particularly, when the sensor 10 is operating, light from source 20 passes along the T-fibers in bundle 28 through the optical separator gap 18 acting as an optical beam splitter. The purpose of the splitter/separator gap 18 is to allow the transmission of light to the target via the T-fibers and to return reflected light on the T-fibers to crossover to the R-fibers 34 optically coupled to the detector 36.

Accordingly, the transmitted light via the beam separator/splitter gap 18 on the T-fibers of bundle 28 travels to the T-fibers in bundle 26 and thereafter across gap 24 to the target surface 22. At the target surface 22, the light is reflected and returned along both the T-fibers of bundle 26 and the R-fibers 30. The light that enters R-fibers 30 is conveyed to detector 32 which provides an output signal $E_1$ which corresponds to the amount of light received which operates along the lines of a typical conventional fiber optic sensor.

A modification of this is to allow the light reflected back in the T-fibers of bundle 26 to pass into the beam separator/splitter gap 18 where it crosses over to the R-fibers 34 to a degree depending upon the degree of efficiency of the separator/splitter. The light in R-fibers 34 is conveyed to the detector 36 which provides an output $E_2$ in response thereto. Any light that remains in the T-fibers 28 is returned to the source 20 and lost.

The two signals $E_1$ and $E_2$ are two characteristically different functions of gap size 24. $E_1$ represents that of the typical bifurcated T-R fiber optic probe used for measurement of displacement, where the T-fiber transmits light to the target and the R-fiber collects the reflected light. In such a device at zero gap, there is zero output because both the T and R-fibers are in direct contact with the target surface, and none or very little light gets transferred to the R-fibers. As the gap is opened, the R-fibers begin to pick up a proportionately larger amount of light, due to the interaction of the overlapping cone areas of the transmitting and receiving fibers. (See U.S. Pat. No. 3,327,584) This can be seen in FIG. 2 which is a graph of a set of values received for $E_1$ and $E_2$ during operation of the device. Note that two outputs are provided for $E_1$ that being for a "polished surface" and that for a "dark surface" of the target. As can be seen, without compensation for reflectivity (manual or automatic), the values of $E_1$ for the two graphs represent a 4:1 difference in reflectivity. Gross errors would result if the user was not aware of the reflectivity change.

Accordingly, a means for providing automatic compensation for reflectivity change, as aforenoted, is to allow the light originally transmitted by T-fibers to be reflected back thereon by the target and conveyed to a second detector 36 to provide an output signal therefrom $E_2$. Note that in such a situation, light going down the T-fibers simply strikes the targets surface 22 and largely returns back up the same T-fibers. This light is then principally conveyed to R-fibers 34 via the beam splitter gap 18, to enable the generation of a signal $E_2$ for the respective surfaces as shown.

As can be seen in FIG. 2, at a zero gap, the respective curves for the $E_2$ signals are at their maximum and gradually reduce the greater of gap between the probe end 14 and target surface 22. This signal $E_2$ can thus be used to determine the gap 24 up to the point of contact with the target surface 22, if so desired. Of course, appropriate reflectivity compensation may be utilized in conjunction with the $E_2$ signal. Note that in FIG. 2 the $E_2$ signal for the polished surface and the $E_2$ signal for the unpolished surface should ideally ultimately converge. However due to a leakage of light transmitted from T-fibers 28 to T-fibers 26 which is reflected back onto R-fibers 34, this does not occur. This reflected light can, however, obviously be reduced by the anti-reflective coating.

Figure 3:
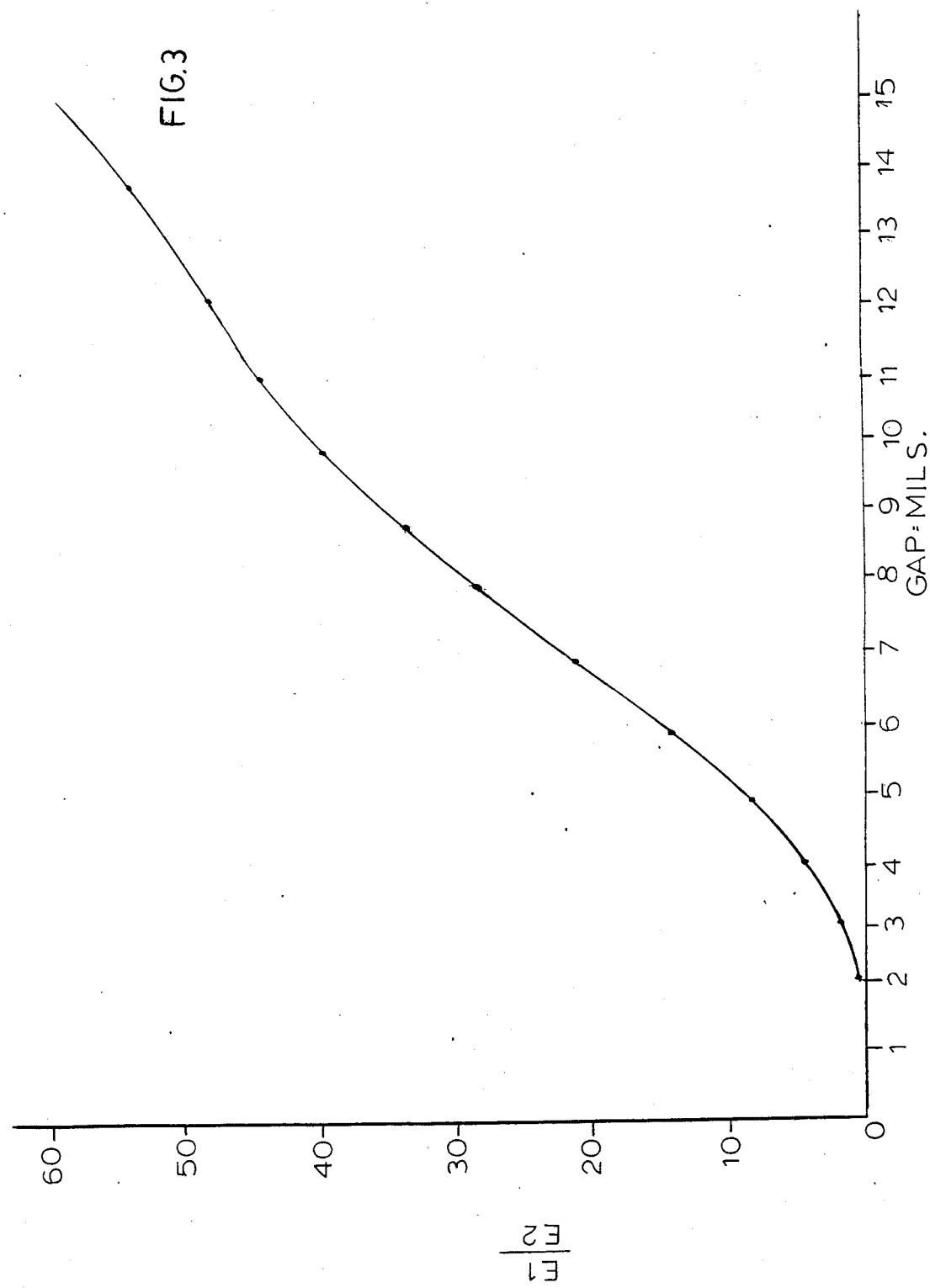
FIG. 3 is a graphical representation of the ratio of the outputs in FIG. 2 to depict the compensatory feature of the fiber optic sensor.

Returning now to the FIG. 1, the output signal $E_1$ and $E_2$ are then coupled to a compensating means 38, which may be of a standard circuitry, which provides an output equal to the ratio of $E_1/E_2$. FIG. 3 represents a plot of the values of $E_1$ and $E_2$ as the ratio $E_1/E_2$ with the "dot" plotted for the polished and highly reflective surface As is readily apparent by this graph, the aforenoted sensor provides a high degree of automatic reflectivity compensation. This effectiveness is further illustrated in FIG. 2 where the crossover points (indicated by circles) of the $E_1$ and $E_2$ outputs for the different levels of reflectivity, is very nearly the same gap dimension of 5 mils. The relatively fixed location of the crossover point with respect to the gap reveals the accuracy of this compensation technique for variations in reflectivity.

As aforementioned, in the present invention an air gap as shown acts as the splitter 18 whereby the T-fibers in bundle 28 are not directly aligned and the light being transmitted serves to illuminate the gap rather than particular T-fibers in bundle 26 which would be the same on the return. This allows for the crossing over of the light to the R-fibers 34 from the T-fibers in bundle 26 for the purposes as afore-noted.

Figure 4:
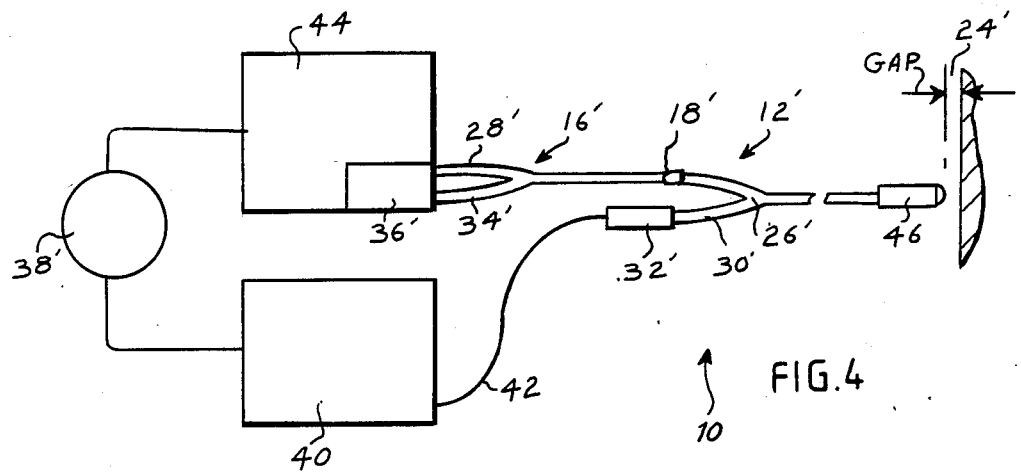
FIG. 4 is a schematic, partially block diagram representation of the fiber optic sensor having an optical extender coupled therewith, incorporating the teachings of the present invention.

Turning now to FIG. 4, there is depicted a fiber optic sensor designated with parts similar to previously described sensors similarly numbered but with a prime. This sensor 10' is similar to that aforenoted but operates in an improved manner for reasons that will be apparent. It comprises essentially two standard probes or assemblies 12' and 16' coupled by a fiber optical beam splitter 18' which is in the form of a light gap (approximately 1/16"). Assembly 12' is coupled via R-fibers 30' to a detector 32' which may for example take the form of that cartridge manufactured by Mechanical Technology Incorporated, 968 Albany-Shaker Road, Latham, N.Y., Model No. KD-C3R, which in turn is coupled to a sensor 40 (Fotonic Sensor, Model No. KD-245) via an electrical cable 42.

The T-fibers of bundle 26' are coupled to the second probe or assembly 16' via the beam splitter gap 18'. Assembly 16' in turn is coupled to a light source via the T-fibers in bundle 28' and a detector 36' via R-fibers 34'. The detector and light source may be contained in a sensor 44, for example, offered for sale Model No. KD-100 entitled "Fotonic Sensor" by Mechanical Technology Incorporated. These two sensors would provide a read out ($E_1$, $E_2$ to compensator 38') which is similar to that depicted in FIG. 2 which compensates for reflectivity changes as aforenoted except that the probe or assembly is advantageously provided with an optical extender 46 which may take the form of that set forth in U.S. Pat. No. 3,940,608 issued Feb. 24, 1976, the disclosure of which is incorporated herein by reference. This optical extender 46 may also be for example that manufactured as aforenoted Model No. KD-LS-1 "Optical Extender".

Figure 5:
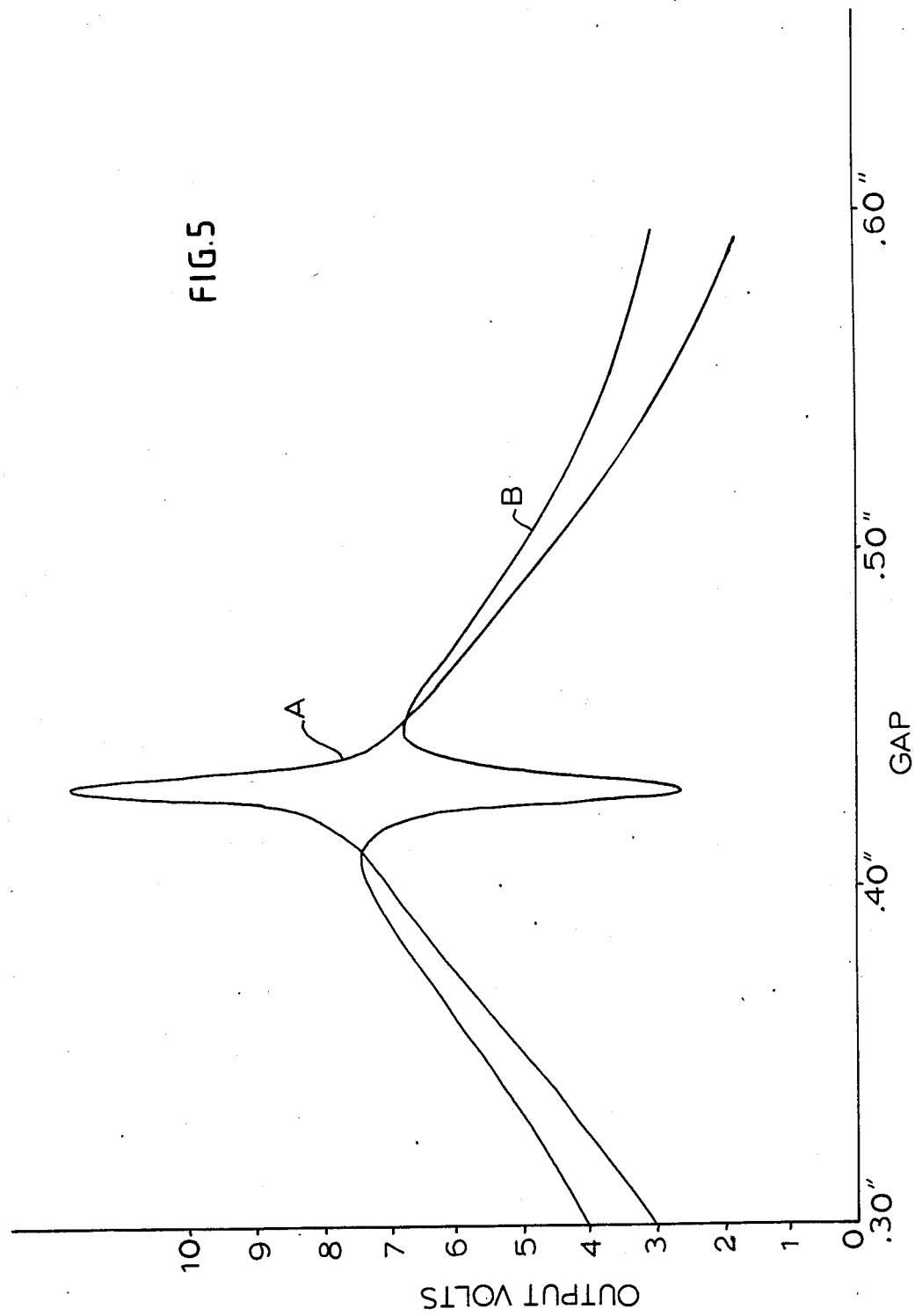
FIG. 5 is a graphical representation of the character curve of the fiber optic sensor in combination with the optical extender.

Accordingly, due to the extender 46, the distance or gap 24' between the tip of the extender 46 and target surface 22' may be increased thereby advantageously increasing the working distance and measuring range capability of the device and combining with this the automatic reflectivity compensation. In this regard FIG. 5 shows a graph of the output of the sensors 40 and 44 at an increased gap distance. The curve A depicts the sharp peaking of the signal in sensor 44, which is simultaneous with the sharp null produced in sensor 40, as shown by curve B. As explained in U.S. Pat. No. 3,940,608, curve B corresponds to a typical direct reflective type sensor, except at a larger gap with a null or image focal point shown somewhat centered in the curve. This null occurs since the bright fiber image on the target from the T-fibers is retransmitted back through the extender 46 along the precise lines that it is transmitted and the R-fibers (to detector 32') receive little if any light thus producing the null. Accordingly, since the light is reflected back to the T-fibers and to detector 36', this causes the peaking of curve A at this point.

Thus it is readily apparent from the foregoing invention that its objects and advantages aforenoted are realized and although a preferred embodiment have been disclosed and described in detail herein, its scope should not be limited thereby, rather its scope should be determined by that of the appended claims.

What is claimed is:

1. A fiber optic proximity detector for use in sensing the relative position of an object or change thereof, comprising:
    probe means which includes a plurality of light conveying fibers which includes a group of light transmitting and at least two separate groups of light receiving fibers;
    said light transmitting fibers adapted to transmit light from a light source to the object which is reflected by the object; optical splitter means;
    a first group of light receiving fibers adapted to convey light reflected from the object directly to a first light detector without passing through said optical splitter means;
    a second group of light receiving fibers adapted to convey light reflected from the object to a second light detector;
    said optical splitter means positioned between said light transmitting fibers and said second group of light receiving fibers to allow light to pass therebetween said optical splitter means comprising an air gap and said light transmitting fibers on said air gap's nearer side to the object and to said first group of light receiving fibers not being directly aligned with said light transmitting fibers on said gap's other side but rather with said second group of receiving fibers on said gap's said other side;
    said light transmitting fibers adapted also to convey light reflected by the object to the splitter means and in turn to the second group of light receiving fibers;
    first and second light detectors optically coupled to the first and second groups of light receiving fibers to sense the respective light conveyed thereby, said detectors being capable of providing respective outputs corresponding to the amount of light conveyed by the respective groups of fibers; and
    compensating means coupled to said detectors to receive the respective outputs and capable of providing an output which compensates for a change in reflectivity of the object based upon said outputs which is utilizable to determine the distance of the probe from the object.

2. The device in accordance with claim 1 in which an optical extender means is coupled to the probe means and operatively connected with the respective light transmitting fibers and first group of light receiving fibers whereby the working distance of the probe from the object is extended.

3. The device in accordance with claim 1 wherein said compensating means includes means for ratioing the outputs from the respective groups of fibers.

4. The device in accordance with claim 2 wherein the output of first and second detectors are $E_1$ and $E_2$ respectively and said compensating means provides an output in accordance with the ratio of $E_1/E_2$.

* * * * *